United States Patent
Schunke et al.

(10) Patent No.: US 6,805,227 B2
(45) Date of Patent: Oct. 19, 2004

(54) ELECTROMOTIVE SERVO DRIVE

(75) Inventors: Kurt Schunke, Minden (DE); Bernd Buchholz, Rahden (DE); Dieter Palm, Werther (DE); Gerhard Bruns, Bückeburg (DE)

(73) Assignee: RK Rose + Krieger GmbH & Co. KG Verbindungs- und Positioniersysteme, Minden (DE)

( * ) Notice: Subject to any disclaimer, the term of this patent is extended or adjusted under 35 U.S.C. 154(b) by 0 days.

(21) Appl. No.: 10/693,811

(22) Filed: Oct. 24, 2003

(65) Prior Publication Data

US 2004/0159513 A1 Aug. 19, 2004

Related U.S. Application Data

(63) Continuation of application No. PCT/EP02/03833, filed on Apr. 6, 2002.

(30) Foreign Application Priority Data

Apr. 27, 2001 (DE) .......................................... 101 20 832

(51) Int. Cl.⁷ ....................... H02K 7/116; H02K 7/112; F16D 49/00; F16D 67/02
(52) U.S. Cl. ................... 192/12 B; 185/40 B; 192/150; 251/129.11; 251/129.13; 251/248; 464/37
(58) Field of Search ............................... 192/12 B, 223, 192/144, 150; 251/129.11, 129.12, 129.13, 248; 185/40 B, 40 R; 464/37

(56) References Cited

U.S. PATENT DOCUMENTS

| | | | | |
|---|---|---|---|---|
| 4,621,789 A | * | 11/1986 | Fukamachi | ............ 251/129.12 |
| 6,634,480 B2 | * | 10/2003 | Peter et al. | .................. 192/224 |
| 2001/0030518 A1 | * | 10/2001 | Reimann | ..................... 318/254 |
| 2003/0178257 A1 | * | 9/2003 | Oh et al. | ................... 185/40 R |

FOREIGN PATENT DOCUMENTS

| | | | |
|---|---|---|---|
| CH | 614 507 A5 | * | 11/1979 |
| DE | 42 40 688 A | | 6/1994 |

* cited by examiner

Primary Examiner—Rodney H. Bonck
(74) Attorney, Agent, or Firm—Henry M. Feiereisen

(57) ABSTRACT

An electromotive servo drive includes a drive motor having an external rotor and a drive train in driving relationship with the drive motor and having an output member operatively connected to a control element to be adjusted. A locking device having a brake element is movable between a release position in which the rotor is free to rotate and an operative position in which the rotor is locked in place. Operatively connected to the brake element is a reset spring for maintaining the rotor at a standstill, when the reset spring is under tension, wherein the reset spring tensioned by turning an actuating shaft by hand.

19 Claims, 4 Drawing Sheets

ELECTROMOTIVE SERVO DRIVE

CROSS-REFERENCES TO RELATED APPLICATIONS

This application is a continuation of prior filed copending PCT International application no. PCT/EP02/03833, filed Apr. 6, 2002, on which priority is claimed under 35 U.S.C. §120, the disclosure of which is hereby incorporated by reference.

This application claims the priority of German Patent Application, Serial No. 101 20 832.4, filed Apr. 27, 2001, pursuant to 35 U.S.C. 119(a)–(d), the disclosure of which is incorporated herein by reference.

BACKGROUND OF THE INVENTION

The present invention relates, in general, to an electromotive servo drive for adjusting a control element.

Servo drives involved here are primarily used in heating, air-conditioning and ventilation systems, for opening and closing control elements such as flap valves, Hereby, the normal basic position may also be an intermediate position. Associated to the electromotive adjustment drive is a control unit. Some applications may require an opening or closing of the control element, such as in case of a danger, e.g. adjustment of the flap valve in the event of fire.

Conventional electromotive servo drives use drive motors having a rotor disposed within a fixed stator. The drive motor has an output journal and a pinion which is wedged on the output journal in fixed rotative engagement. The downstream drive train is hereby so configured that the rotation speed of its output member is significantly smaller than the rotation speed of the output journal of the drive motor. A locking device is provided to maintain the control element in proper end position. A drawback of conventional servo drives is the disposition of the locking device within the drive train and the considerable brake moment as a consequence of the reduced rotation speeds.

Many conventional servo drives are configured as so-called spring-return mechanisms, i.e. a spring assembly, for example a spiral spring, is tensioned when the motor is operated to implement the adjustment, so that the return movement of the control element is effected by the restoring force of the spring assembly. Servo drives of this type are relatively bulky, rendering their installation in some cases prohibitive because the installation space is oftentimes very narrow.

It would therefore be desirable and advantageous to provide an improved electromotive servo drive which obviates prior art shortcomings and is compact in structure, while still being reliable in operation.

SUMMARY OF THE INVENTION

According to one aspect of the present invention, an electromotive servo drive includes a drive motor having an external rotor, a drive train in driving relationship with the drive motor and having an output member operatively connected to a control element to be adjusted, and a locking device having a brake element movable between a release position in which the rotor is free to rotate and an operative position in which the rotor is locked in place, a reset spring operatively connected to the brake element for maintaining the rotor at a standstill, when the reset spring is under tension, and a manually-operated actuating shaft for tensioning the reset spring and moving the control element to a base position.

The present invention resolves prior art shortcomings by configuring the locking device to act on the rotor of the drive motor, i.e. at a location in which the respective torque of the entire drive train is the smallest so that the brake moment to be applied is minimized. In addition, the servo drive becomes hereby compact. As the rotor is held by hand when the reset spring is tensioned, the base position of the control element can be easily and precisely established. Adjustment of the base position of the control element can be implemented in a particularly simple way by attaching at least one wheel of the drive train on the actuating shaft and by tensioning the reset spring through turning of the actuating shaft, when the rotor is at a standstill. As the actuating shaft is accessible from outside, the actuating shaft becomes, in effect, a driving element that moves the following part of the drive train in order to move the control element in driving relationship with the output member of the drive train into the intended end position. The drive train is therefore configured to maintain the rotor of the drive motor and possibly the following wheels up to the actuating shaft at a standstill. Suitably, the wheel is supported on the actuating shaft via a freewheel or an overrunning clutch. In this way, the output member of the drive train and the control element can be adjusted, while the rotor stands still. In addition, the freewheel or overrunning clutch allows the rotor during return run, as realized by the reset spring, to coast, when the output member of the drive train strikes against a stop. Therefore, there is no abrupt halting that would require application of great forces.

According to another feature of the present invention, the actuating shaft may be supported through frictional engagement in a bushing which thus conjointly moves, when the actuating shaft is rotated, wherein stops are provided for limiting a rotation angle of the bushing in both rotation directions.

According to another feature of the present invention, the locking device may include a lever, which is supported by the bushing, and a reset spring, which has one end linked to the lever and another end linked to the bushing. Thus, the lever is rotated via the reset spring in a same rotation direction as the actuating shaft. As the lever is part of the locking device, the brake member stays in contact with the rotor of the motor. The rotation angle of the conjointly moved bushing is greater than the rotation angle of the lever, so that the difference between the rotation angles is commensurate with a pressing force by which the brake member is urged against the rotor via the reset spring, whereby the brake member rotates in relation to the lever.

According to another feature of the present invention, the brake member may be configured as a double-armed lever having first and second arms extending at an angle to one another, e.g. an acute angle. As a result, the brake member is elastic to ensure a smooth and soft bearing against the rotor of the drive motor. In addition, when the tension of the reset spring is released during reverse movement, the rotor is ensured to run freely during the start-up phase. The elasticity of the brake member can further be enhanced, when the arms of the brake member are interconnected by a spring element, preferably an annular spring element.

When the rotor is not decelerated, the brake member suitably strikes against a stationary stop. To maintain a sufficient distance of the contact surface of the brake member in relation to the circumferential area of the rotor, the pivoting movement of the brake member in direction toward the stop is assisted by a spring element, e.g. a spring bar. Suitably, the spring element is tensioned when the brake member is moved toward the rotor and applies the thus stored restoring force to move the brake member back to the release position. Instead of a spring bar, it is, of course, also possible to use a tension spring having one end attached to the lever of the locking device or the brake member and another end attached to a fixed component.

According to another feature of the present invention, a coupling element may be mounted in the connection between the actuating shaft and the rotor and so configured to allow a coasting of the rotor when rotated, as the spring element relaxes and the lever mechanism strikes against a stop, and ultimately resulting in a halting of the rotor. This coupling element may be disk-shaped and connected with a drive wheel which is associated to the drive motor.

Release of the locking device by hand is necessary for certain applications. Thus, according to another feature of the present invention, the actuating shaft may be provided with a spring element, e.g. a wrap spring, for urging the actuating shaft to seek a rotation in opposition to a rotation to realize a tensioning of the reset spring so as to release the locking device. Use of a wrap spring is currently preferred because the wrap spring does not lock in one direction, while acting as a catch in the other direction. Suitably, the spring element is disposed in a gap between the actuating shaft and the bushing. When releasing the locking device by suitably turning the actuating shaft, the freewheel in the drive train allows the rotor of the drive motor to freely rotate until it halts and comes to a standstill. Jerky loads are thus prevented.

Of course, tensioning of the reset spring may not only be realized by manually turning the actuating shaft but the use of an electric tool may also be conceivable. To prevent the reset spring from damage as a result of overrotation, the servo drive may be provided with an overload safety mechanism. The overload safety mechanism is so configured as to allow transmission of a certain torque and may include two coupling parts so constructed as to prevent movement of one coupling part, when a predetermined torque is exceeded. As interacting coupling parts, the overload safety mechanism may include a toothed disk and a spring washer having several radial spring legs with angled ends for engagement in peripheral spaces between teeth of the toothed disk. When the angled ends of the spring jump the teeth, an acoustic noise is triggered to indicate to the operator to terminate a rotation of the actuating shaft.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
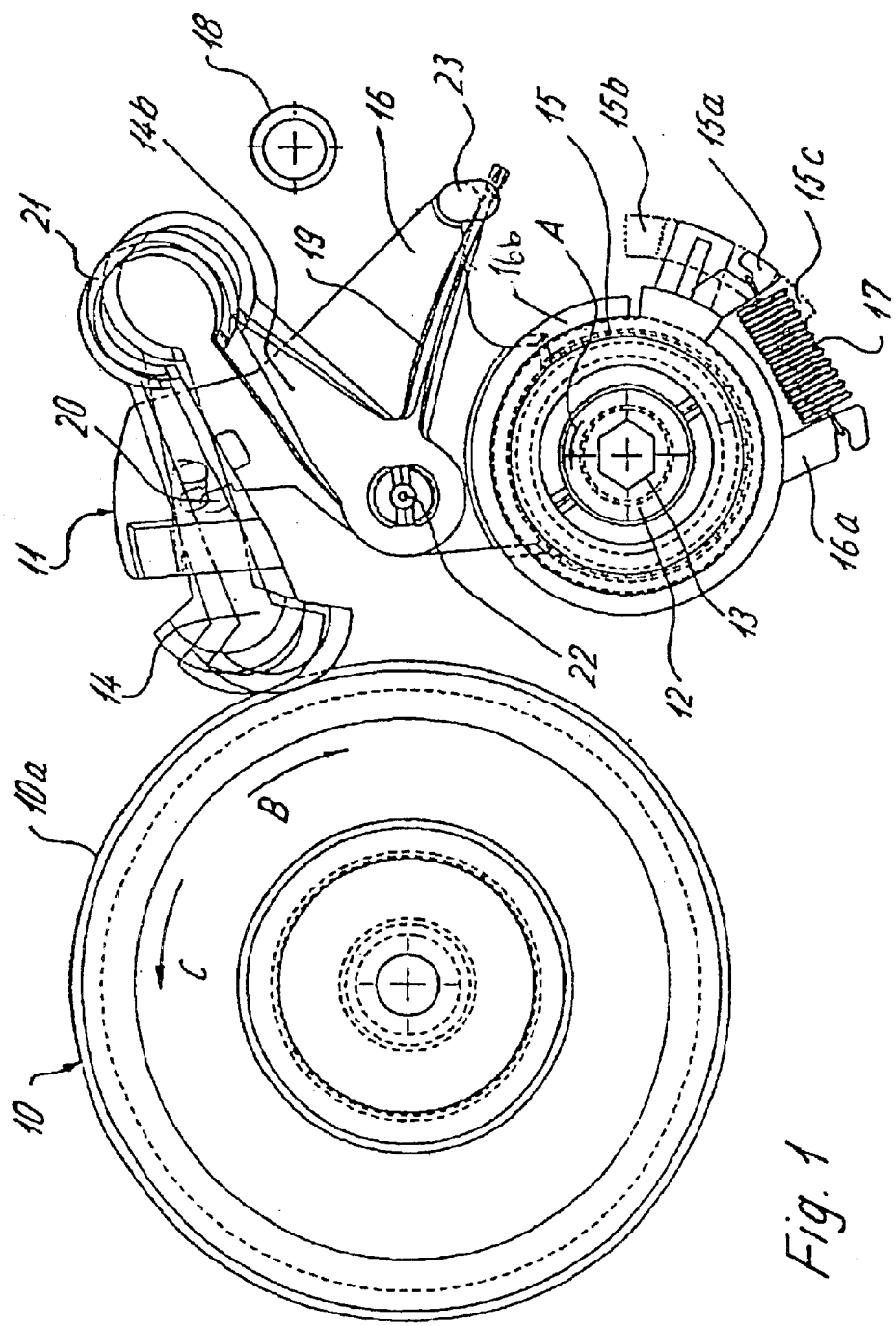
FIG 1 is a vertical projection of an electromotive servo drive according to the present invention, illustrating an operative position of the locking device to halt the rotor of a drive motor.

Throughout all the Figures, same or corresponding elements are generally indicated by same reference numerals.

These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of four applications all filed on the same day. These applications deal with related inventions. They are commonly owned and have same inventive entity. These applications are unique, but incorporate the other by reference. Accordingly, the following U.S. patent applications are hereby expressly incorporated by reference: "Electromotive Adjustment Device", and "Adjustment Device", and "Adjustment Drive", respectively.

Turning now to the drawing, and in particular to FIG. 1, there is shown a vertical projection of an electromotive servo drive according to the present invention, including a drive motor 10 having an external rotor 10a. The drive motor 10 includes a mounting flange (not shown) for attachment within a housing of the servo drive. Drive motors 10 of this type are generally known and commercially available. When at a standstill, the rotor 10a is maintained at standstill by a locking device, generally designated by reference numeral 11 and described in more detail furtherbelow.

The servo drive further includes a reset spring 17 which can be tensioned, when a manually-operated actuating shaft 12 is turned clockwise, as indicated by arrow A. The actuating shaft 12 can be manually operated by a suitable tool to move a control element into a base position and extends in axis-parallel relationship to a rotation axis of the rotor 10a and has a hexagon head 13 or may also have a hexagon socket to enable attachment of a suitable tool to turn the actuating shaft 12.

Figure 1A:
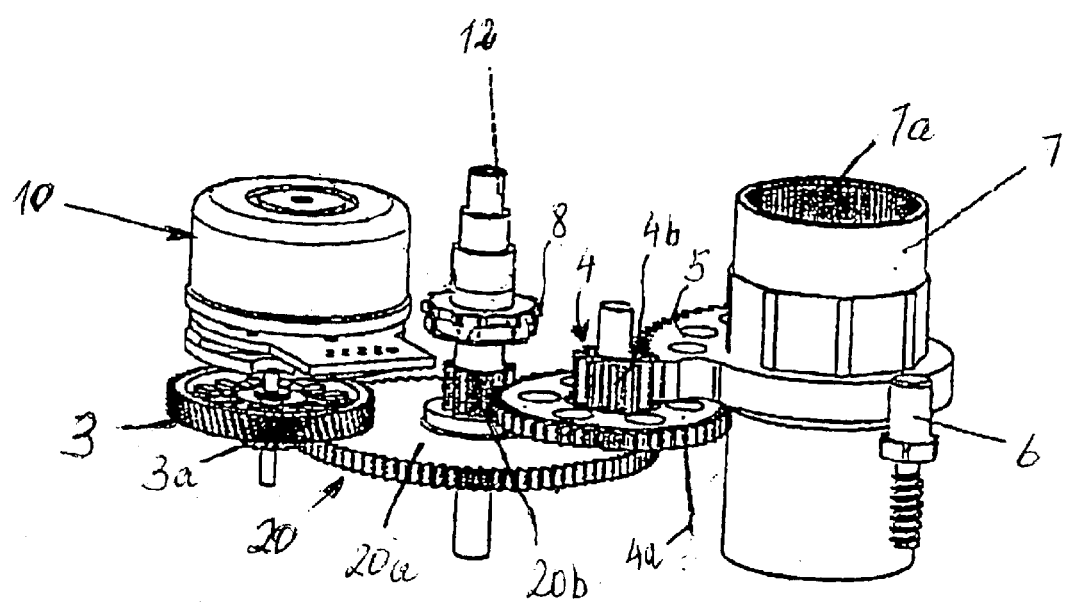
FIG. 1a is a perspective view of the servo drive, illustrating the drive train downstream of the drive motor.

As shown in FIG. 1a, the drive motor 10 has an output journal (not shown), which may be a splined output shaft with an involute gear tooth system with multiple teeth, or an output shaft with an involute gear tooth system with multiple teeth, whereby the output journal is in mesh with a helical gear wheel 3. The helical gear wheel 3 is part of a double gear wheel assembly whose other smaller gear wheel 3a is in fixed rotative engagement with a gear wheel 20a of a double gear wheel assembly, generally designated by reference numeral 20. The gear wheel 20a is supported on the actuating shaft 12. The other gear wheel 20b of the double gear wheel assembly 20 has a significantly smaller number of teeth and drives a greater gear wheel 4a of a further double gear wheel assembly, generally designated by reference numeral 4 whose other smaller gear wheel 4b is in mesh with a gear wheel 5 which has a relatively high number of teeth. The gear wheel 5 represents the output member of the drive train and has a tooth segment extending about 90°. The gear wheel 5 is movable between end stops 6 (only one is visible in the illustration of FIG. 1a) and has a central bore for receiving a hollow shaft 7 which is restrained against rotation in the bore of the gear wheel 5 via complementary profiles. The hollow shaft 7 is provided with internal teeth 7a to attain a form-fitting connection with a coupling element (not shown) that is insertable therein for adjusting the control element.

When the drive motor 10 is idle and the reset spring 17 is relaxed, a brake member 14 of the locking device 11 bears against the rotor 10a, without applying a significant pressing force. As soon as the actuating shaft 12 is turned to tense the reset spring 17, the brake member 14 is urged by the reset spring 17 against the rotor 10a. When turning the actuating shaft 12 counterclockwise, the rotor 10a is at a standstill because a drive wheel 8 supported on the actuating shaft 12 includes a freewheel.

A bushing 15 is disposed in surrounding relationship to the actuating shaft 12 and in frictional contact therewith in such a manner that a turning of the actuating shaft 12 counterclockwise conjointly moves by friction the bushing 15. In order to limit a rotation movement by the bushing 15, the bushing 15 includes an extension arm 15a which strikes against a stop 15b.

In addition to the brake member 14, the locking device 11 includes a lever 16 which supports the brake member 14 and has a bearing element 16b to embrace the bushing 15 from outside. The bearing element 16b includes a slot or recess 16c for passage of the extension arm 15a of the bushing 15, and is formed with an extension arm 16a which is positioned at an angular distance to the extension arm 15a of the bushing 15. Both extension arms 15a, 16a have hook-shaped ends for attachment of the ends of a reset spring 17. As the bushing 15 is moved by the turning of the actuating shaft 12, the lever 16 is also moved by the reset spring 17. As a consequence, the brake member 14, supported on the lever 16, is moved into contact with the rotor 10a of the drive motor 10. This position is shown in FIG. 1, whereby the reset spring 17 is not yet under tension. The extension arm 15a of the bushing 15 is hereby positioned against a stop 15c. As soon as the actuating shaft 12 is turned slightly in the direction of arrow A, the extension arm 15a strikes against the stop 15b, thereby terminating the pivoting movement of the bushing 15 and the lever 16. Still, the actuating shaft 12 can still be turned further to tense the reset spring 17. In view of the difference in the rotation angle, a pressing force is applied via the reset spring 17 onto the rotor 10a. When the rotation of the actuating shaft 12 in direction of arrow A is stopped, the brake member 14 applies a sufficient braking force upon the rotor 10a to restrain it against rotation.

Figure 2:
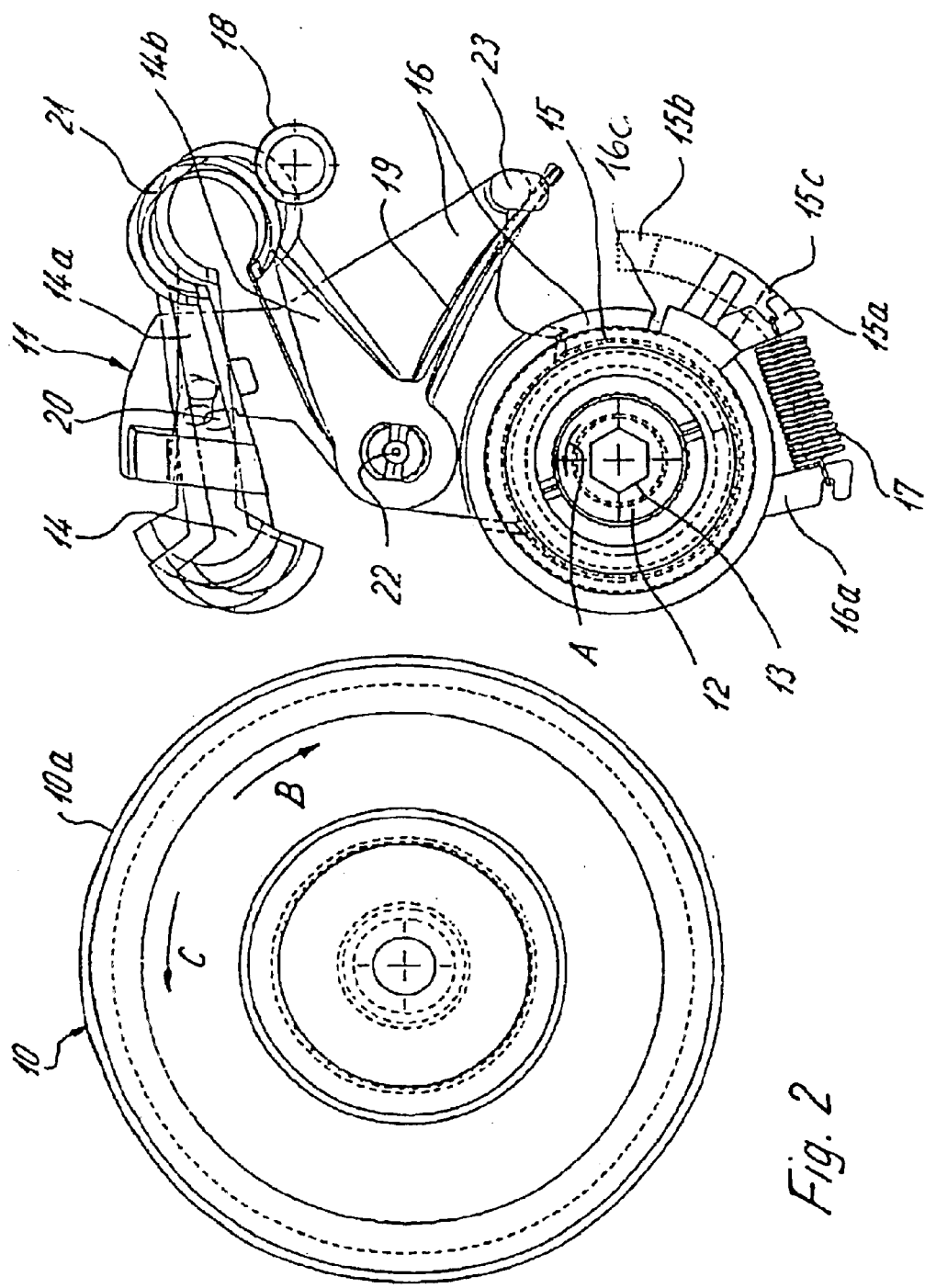
FIG. 2 is a vertical projection of the electromotive servo drive of FIG. 1, illustrating the locking device in a release position.

FIG. 2 shows the locking device 11 in release position. This position is realized by turning the actuating shaft 12 in opposition to the direction of arrow A, i.e. counterclockwise. As soon as the brake member 14 disengages from the rotor 10a, turning of the actuating shaft 12 can stop. The brake member 14 strikes against a stationary stop 18, and the rotor 10a is rotated by the reset spring 17 in direction of arrow B. The end positions of the output member 5 of the drive train are limited by stops 6. As soon as the output member 5 has reached the end position, turning of the actuating shaft 12 is no longer possible. However, as the drive train between the actuating shaft 12 and the drive motor 10 includes a freewheel, the rotor 10a is able to coast until coming to a halt. As the actuating shaft 12 is turned counterclockwise, the output member 5 of the drive train pivots. Thus, the counterclockwise rotation of the actuating shaft 12 not only tensions the reset spring 17 but also moves the control element, e.g. a flap valve, that is coupled to the output member 5. The end position of the control element that defines the base position is thus realized by turning the actuating shaft 12.

A movement of the control element into the other end position, if required, is implemented by energizing the drive motor 10. The rotor 10a then rotates in direction of arrow C, i.e. counterclockwise and in opposition to rotation direction B in which the rotor 10a is rotated back by the reset spring 17, as the reset spring 17 relaxes. The brake member 14 disengages form the outer surface of the rotor 10a by the action of a spring bar 19 which is connected to the brake member 14 on the side of the bearing element 16b of the lever 16. The spring bar 19 is under tension when the brake member 14 bears against the rotor 10a. As soon as the contact is broken by the rotation of the rotor 10a in direction C, the spring bar 19 relaxes and the brake member 14 is able to strike against the stationary stop 18. Of course, the provision of the spring bar 19 is shown only by way of example. Instead, it is certainly conceivable to effect the pivoting movement of the brake member 14 by a tension spring linked to the brake member 14.

The drive motor 10 is operated only as long as the control element needs to move from the base position to the end positions. Once the drive motor 10 is idle, the brake member 14 is brought again into contact with the rotor 10a. When the rotor 10a rotates counterclockwise in direction C, the actuating shaft 12 turns in a same direction.

Return of the control element may be realized by the reset spring 17 as well as by hand. When using the reset spring 17, the actuating shaft 12 is turned in opposition to the direction A, i.e. clockwise. As a consequence, the locking device 11 is pivoted also clockwise so that the brake member 14 strikes against the stop 18 and the rotor 10a can coast in direction B, i.e. clockwise. The brake member 14 is further provided with a locking cam 20 which is securely mounted to the lever 16 and is able to swing clockwise about an axis 22. An annular spring element 21 of the brake member 14 urges the locking cam 20 into the initial position so that the spring bar 19 in the form of a return spring is under tension again. The brake member 14 is thus moved in relation to the lever 16. The lever 16 is further provided with a stop 23 which is tensioned in an area of the free end of the spring bar 19.

The brake member 14 is constructed as a double-armed lever 14 with two lever arms 14a, 14b extending at an acute angle and interconnected by the annular spring element 21. The lever arm 14a interacting with the rotor 10a is guided in a pocket of the lever 16, whereby the pocket is formed by an angled portion. A prolongation of the longitudinal center axis of the lever arm 14 intersects the rotation axis of the rotor 10a or may also extend at a slight distance thereto, when the brake member 14 is in contact with the rotor 10a.

Figure 3:
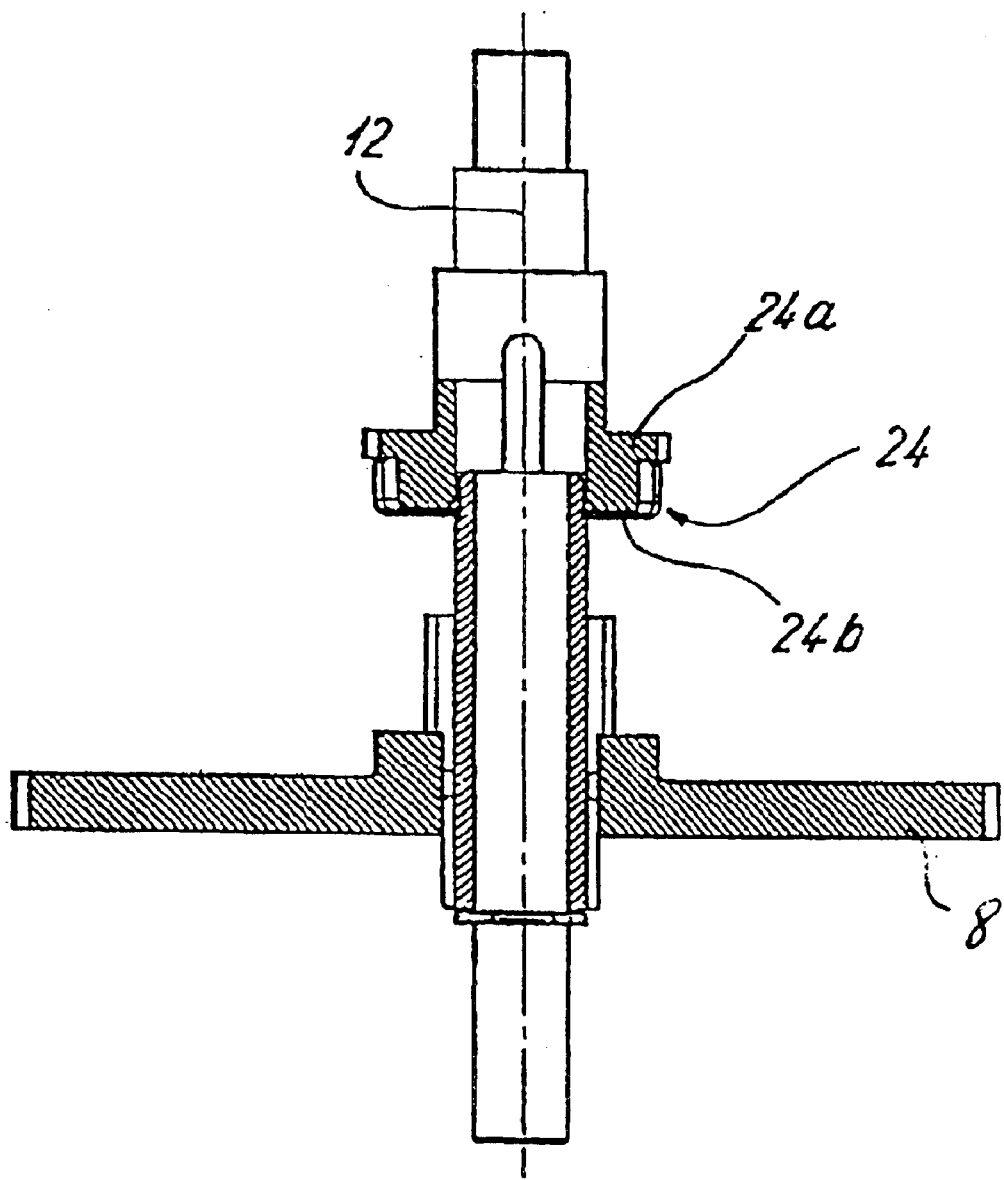
FIG. 3 is a partly sectional view of an overload safety mechanism incorporated in the servo drive for protecting the reset spring from overrotation.

Turning now to FIG. 3, there is shown an overload safety mechanism, generally designated by reference numeral 24, for protecting the reset spring 17 against excessive turning. The overload safety mechanism 24 includes a toothed disk 24a and a spring washer 24b which has several arms radiating in a star-shaped configuration and having free angled ends for engagement in spaces between the teeth of the toothed disk 24a. Thus, as the actuating shaft 12 is turned, a certain torque is transmitted onto the reset spring 17. When the torque is exceeded, the angled ends deform and jump the teeth.

Of course, the overload safety mechanism may also be constructed in a different way. For example, it may have two disks, which are splined at their confronting sides, whereby at least one of the disks is spring-loaded so that a disk moves relative to the other disk, when the torque is exceeded. Suitably, the overload safety mechanism should be configured in such a way that an operator turning the actuating shaft 12 perceives generated noises to terminate the turning operation.

A relevant aspect of the present invention is thus a braking of the rotor 10a during tensioning of the reset spring 17 so as to prevent the rotor 10a from reversing the movement when, e.g., the rotation movement is momentarily interrupted. Another relevant aspect of the present invention is the fact that the reset spring drives the rotor 10a during a momentary rotation movement in the opposite direction.

The servo drive according to the present invention may also be used for adjusting control elements in case of fire. In order to ensure the operation of the servo drive even at elevated temperatures, the mentioned components are made of metal, for example, steel or non-ferrous heavy metal.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. An electromotive servo drive, comprising:
   a drive motor having an external rotor;
   a drive train in driving relationship with the drive motor and having an output member operatively connected to a control element to be adjusted;
   a locking device having a brake element movable between a release position in which the rotor is free to rotate and an operative position in which the rotor is locked in place;
   a reset spring operatively connected to the brake element for maintaining the rotor at a standstill, when the reset spring is under tension; and
   a manually-operated actuating shaft for tensioning the reset spring and moving the control element to a base position.

2. The servo drive of claim 1, wherein the drive train has a drive wheel which is supported on the actuating shaft.

3. The servo drive of claim 2, and further comprising a freewheel or overrunning clutch for supporting the drive wheel on the actuating shaft.

4. The servo drive of claim 1, wherein the actuating shaft is disposed in axis-parallel relationship to a rotation axis of the rotor.

5. The servo drive of claim 1, and further comprising a bushing for support of the actuating shaft via a frictional engagement so that a rotation of the actuating shaft is accompanied by a movement of the bushing, and further comprising stops for limiting a rotation angle of the bushing in both rotation directions.

6. The servo drive of claim 5, wherein the locking device includes a lever supported by the bushing and a reset spring having one end linked to the lever and another end linked to the bushing.

7. The servo drive of claim 6, wherein the rotation angle of the bushing is greater than a rotation angle of the lever, wherein a difference between the rotation angles is commensurate with a pressing force by which the brake member is urged against the rotor via the reset spring, whereby the brake member rotates in relation to the lever.

8. The servo drive of claim 1, wherein the brake member is a double-armed lever having first and second arms extending at an angle to one another.

9. The servo drive of claim 8, wherein the angle is an acute angle.

10. The servo drive of claim 8, wherein the locking device includes a spring element for interconnecting the first and second arms of the brake member.

11. The servo drive of claim 10, wherein the spring element is an annular spring element.

12. The servo drive of claim 1, wherein the locking device includes an elastic extension arm formed on the brake member for urging the brake member to seek the release position, and further comprising a stop for defining the release position.

13. The servo drive of claim 1, wherein the brake member includes a locking cam to allow movement of the brake member to the release position by hand.

14. The servo drive of claim 1, wherein the actuating shaft includes a spring element for urging the actuating shaft to seek a rotation in opposition to a rotation to realize a tensioning of the reset spring so as to release the locking device.

15. The servo drive of claim 14, wherein the spring element is a wrap spring.

16. The servo drive of claim 1, wherein the spring element is disposed in a gap between the actuating shaft and the bushing.

17. The servo drive of claim 1, and further comprising an overload safety mechanism for protecting the reset spring against overrotation by the actuating shaft.

18. The servo drive of claim 1, wherein the overload safety mechanism includes a toothed disk and a spring washer having several radial spring legs with angled ends for engagement in spaces between teeth of the toothed disk.

19. The servo drive of claim 1, wherein the overload safety mechanism includes two disks in contact with one another, wherein confronting surfaces of the disk are profiled, with one of the disks being spring-biased.

* * * * *